March 7, 1967  B. S. BRYANT  3,308,013
COMPRESSIBLE MAT OF WHOLE WOOD FIBERS AND UNCURED
RESIN AS OVERLAY FOR WOOD PRODUCT
AND PROCESS OF MAKING SAME
Filed Dec. 7, 1965
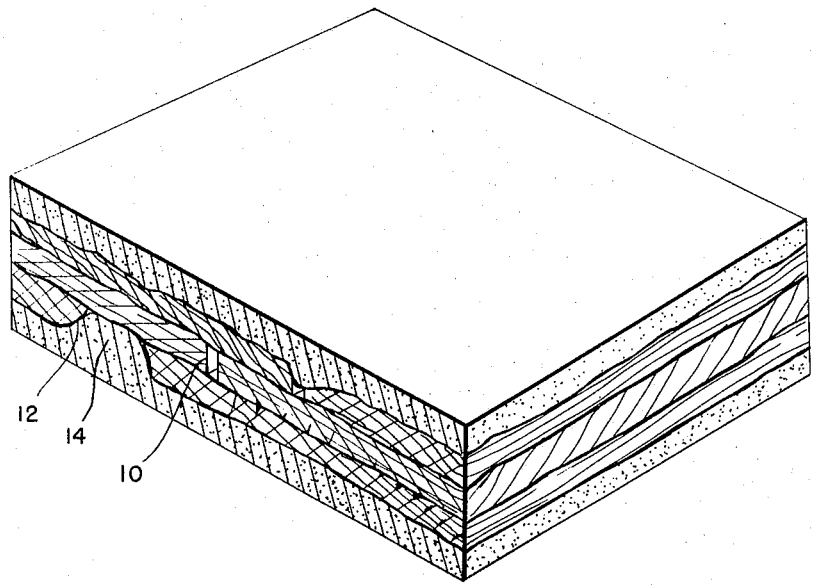
FIG. 1
FIG. 2
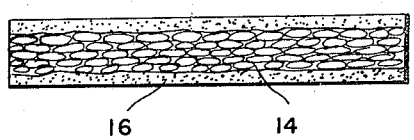
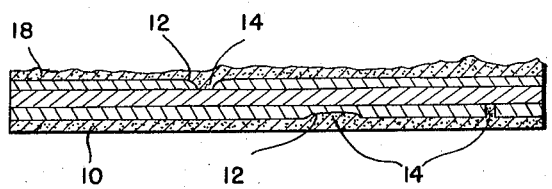
FIG. 3
BENJAMIN S. BRYANT
INVENTOR
BY
ATTORNEY

3,308,013
COMPRESSIBLE MAT OF WHOLE WOOD FIBERS AND UNCURED RESIN AS OVERLAY FOR WOOD PRODUCT AND PROCESS OF MAKING SAME

Benjamin S. Bryant, Seattle, Wash., assignor to Weyerhaeuser Company, Tacoma, Wash., a corporation of Washington
Filed Dec. 7, 1965, Ser. No. 520,018
7 Claims. (Cl. 162—103)

This application is a continuation-in-part of my co-pending application Serial No. 96,923 filed March 20, 1961, entitled "Overlaid Wood Product and the Process of Making the Same" now abandoned.

This invention concerns a process for producing a surfacing material from wood fibers. In particular there is produced hereby a unique, fibrous, surfacing material for plywood or particle board which is particularly adapted to being bonded to the substrate board while the substrate itself is being consolidated and bonded. In this way, plywood and particle boards can be produced with improved surface characteristics in a single pressing operation.

The surface characteristics of softwood plywood and particle board frequently limit their applicability, especially in the manufacture of furniture. For furniture it is desirable to use a base of softwood plywood or particle board because they are strong, low in cost, and relatively dimensionally stable. The surfaces of these materials are frequently not suitable for fine finishes because of differential grain patterns and voids which are revealed through the finish.

Resin treated paper or thin veneer overlays can be bonded to softwood plywood or particle board to provide the decorative surface desired; however, any surface defects of the substrate will be revealed through the overlay and variations in the hardness of the substrate, as in softwood veneer, make the resultant product nonuniform in indentation and puncture resistance. It is, therefore, necessary to use the best possible surface under the overlay.

The process of this invention produces a woody, fibrous, resin-containing mat which can be hot pressed and bonded to lumber, plywood, or particle board substrate. The mat can be bonded to plywood or particle board while the veneers or wood chips are being consolidated and bonded to form the substrate. In this way a fiber surfaced product can be produced in a single hot pressing operation. It is uniquely characteristic of this mat that it differentially consolidates to a specific gravity greater than that of the substrate. In some cases, the specific gravity will be twice that of the substrate.

The mat before bonding is sufficiently strong to be self-supporting over a span of several feet and can be handled by mill personnel in a similar manner to plywood face veneer.

During the hot pressing operation to form the fiber surfaced board the mats at first become somewhat moldable or plastic in nature. This characteristic is important in that the mats readily fill the small voids and irregularities in the surface of the substrate and thus reinforce the bond. A smooth outer surface is also assured by providing support in a void over which the surface could otherwise contract and form a depression.

This invention comprises the mat, the process of producing the mat, and the fiber-surfaced panel produced by simultaneously consolidating and bonding the mat to a substrate. The finished surface produced on the panel is hard, uniform, and adaptable to the application of very thin paper or veneer overlays. The grain or void pattern of the substrate board is suitably masked by the cured and bonded mat, and thin overlays may be applied subsequently without revealing surface defects through the overlay.

The fiber surface is suitable for many uses without applying overlays and forms a particularly good base for paint. Paint defects such as grain raise nonuniform absorption and surface roughness due to small, upstanding, loose fibers are minimized.

The plain fiber surface can also be converted to a decorative surface by kerfing with saws or by embossing with rolls or caul plates.

Referring to the accompanying drawings FIGURE 1 shows a section of panel 10 comprising a multiple-veneer substrate with both outer surfaces bearing the fiber surfacing material. The core gaps 10 and other voids in the veneer surface 12 are partially or wholly filled with cured fiber 14.

FIGURE 2 is a cross section of panel and shows a wood particle substrate surfaced with wood fiber. The natural voids on the substrate surface between the coarse wood particles 16 are filled with cured, resin-bearing fiber 14.

FIGURE 3 is a cross section of a panel with a multiple-veneer substrate and fiber faces showing the surface effect achieved by embossing the fiber face 18.

It is essential in the present invention to control the physical properties of the mat so it can be fully consolidated, cured, and bonded to the substrate during the normal pressing cycle.

The surfacing material is made by first defibrating whole wood chips or other discrete wood particles in an attrition mill in the presence of water to produce a wood fiber slurry. The slurry is then diluted and a water-dispersible resin is added thereto. The mixture is then treated with an acidic agent to precipitate the resin onto the fiber surfaces. The fibers are then screen-formed into a partially dewatered, fibrous mat about ¾" thick having a bone-dry weight of 0.03 to 0.75 pound per square foot. The mat is then further dewatered and partially consolidated by cold pressing until it is between about 0.1 and 0.5 inch thick and has a specific gravity of from about 0.15 to 0.30. It is then dried to between about 12% and 200% moisture content based on the bone-dry fiber weight without curing the resin therein.

The mats so produced have a particular advantage in that they have sufficient internal strength to be manually picked up by their edges and placed on the surface of the substrate prior to pressing. They need not be fully supported over their entire surface by conveyors, tables, rollers and the like. An additional advantage is that the mats can be prepared ahead of time and stored until needed. They can also be made in one location and, because of their ease of handling, can be shipped to another location for use.

No special lay-up, spreading, or pressing mechanisms are required to use the mats on plywood veneer or wood particle substrates. A mill can produce regular plywood, for a time, and then commence producing fiber surfaced plywood panels by substituting the fibrous mats for the regular face veneers.

The adhesive used to bond the mat to the plywood may be the same adhesive that is used to bond the veneers in the production of the plywood itself.

In the case of particle boards no separate glue line is required. It has been found that an excellent bond will be obtained directly between the surfacing material and resin-coated particles of the substrate if more than about 6% resin is used in the surface material.

Lumber can be used as the substrate when it is desired to produce structural panels with a fiber surface. In this application it is necessary to apply an adhesive to the lumber core before applying the mat.

A combination of a lumber inner core, a veneer substrate bonded to the lumber core, and a fiber face bonded to the veneer is useful as a roof decking or high strength floor panel. The smooth fiber surface of such a structure is well adapted to being overlaid with floor tiles or impregnated with asphalt or fire retardants.

The finished panel surface resembles hardboard and is smooth and free of defects. The consolidated and cured surfacing material has a specific gravity based on the dry fiber of about 0.7 to about 0.95 and can vary in thickness from about 0.020 to about 0.125 inch. This is in contrast to the specific gravity of the substrate which remains essentially unchanged during pressing. In the case of veneer substrate the specific gravity of softwood veneers remains between about 0.38 and 0.60 during pressing; the particle board substrate consolidates to about 0.65 during pressing and the fiber mat in either case consolidates to a specific gravity of between about 0.7 to 0.95.

When mats containing more than about 35% moisture are used to produce fiber-faced plywood it is desirable to use screens between the fiber faces and the press platens during pressing to permit escape of moisture. The screen marks in the fiber face may be readily removed by sanding.

The fibers useful in the process can be obtained from low grade wood sources or from mill waste. The undried, waste wood obtained from clipping and trimming veneer in plywood mill operations provides an excellent source of fibers for the mats. A plywood manufacturer can also use trimmings from panels to make the surfacing material, but the amount of this type of material should be limited if light colored surfaces are desired. Most panel trim contains a dried glue film which will color the mat surface although it does not appreciably harm the other surface characteristics.

The wood fibers are best produced in an attrition mill by defibrating green whole wood chips in the presence of water. Such fibers are stiff, long and free draining. Prior to defibrating it is desirable, but not essential, to soften the wood chips under 5 to 30 pounds per square inch steam pressure. Softening by steam facilitates the defibrating process and reduces the amount of wood fiber "fines" produced and thereby maintains a high freeness value in the fibrous slurry. The heating and softening is preferably accomplished in the absence of chemical reagents; thus the whole wood fibers herein produced are not to be compared to the delignified fibers produced in chemical pulping. Also, the whole wood fibers herein produced are not to be compared with conventional groundwood pulps that are used to form low grades of paper, because such groundwood pulps have present a high percentage of "fines" and thus have a low freeness value. Furthermore, the whole wood fibers produced herein cannot be used to form paper because the long, stiff whole wood fibers cannot intertwine and form broad surfaces of contact to develop in drying the high fiber bonding forces required in paper. Compared to paper the tensile strength of the instant mat is very low, but the mat has enough strength for handling. In the instant process, resin binder and mechanical compression with heat are required to bind the fibers together.

Various types of wood may be used as the source of fibers. Softwoods, such as Douglas fir, hemlock, pine and the like, are particularly desirable because they are inexpensive and available in quantity.

For the conventional addition of resin to fiber the fiber slurry is adjusted by the addition of water to a consistency of between about 0.5% and 2.5% solids prior to the addition of the resin and size. This step is necessary to insure easy and thorough mixing during the resin precipitation step and to insure maximum resin-fiber contact. The upper consistency is limited only by the ease of handling and agitating the slurry, while the lower is limited only by the problems and expense of handling large quantities of water.

Alternatively, the resin may be added prior to slurry formation. For example, the resin may be mixed with a fiber as during the grinding operation, and subsequently the slurried fiber may be acidified as described.

Consistency is here defined as the ratio of bone-dry fiber to total weight of fiber and water, expressed as a percent.

A thermosetting resin is used to bind the fibers together. An alkaline, water-dispersible, phenol-formaldehyde resin is preferred. Melamine-formaldehyde and urea-formaldehyde resins may also be used. It is necessary that the resin be thermosetting and precipitable on the fibers by acidification. From the practical standpoint, it is desirable that the resin be in a sufficiently advanced state of condensation to ensure maximum resin retention by the fibers and a minimum of resin loss in the white water.

The optimum resin content is between about 7% and 20% of resin solids based on the dry fiber weight. The exact choice of resin amount will depend on the hardness and internal bond strength desired in the cured surface material. Mats satisfactory for some purposes can be produced with only about 5% of resin solids.

An acid precipitable, alkaline phenol-formaldehyde resin suitable for bonding whole wood fibers by this process is prepared in a resin kettle equipped for agitation, heating, and cooling as follows:

The kettle is charged with:

| | Parts by weight |
|---|---|
| Phenol | 36.94 |
| Water | 5.10 |
| Formaldehyde (37% inhibited grade) | 54.04 |
| Sodium hydroxide (50% solution) | 3.92 |

The charge is agitated continuously and heated to 78° C. in 100 minutes. The temperature is maintained at 78° C. until the viscosity of the charge, measured at 25° C., reaches 182 centistokes. The temperature is then reduced to 75° C. in 25 minutes, and maintained at 75° C. until the charge viscosity reaches 470 centistokes, as measured at 25° C. The completed resin is then cooled to about 20° C. for storage. The finished resin will have approximately the following constants:

| | |
|---|---|
| Molar ratio of formaldehyde to phenol | 1.70 |
| Percent NaOH | 1.96 |
| Specific gravity @ 25/25° C. | 1.165 |
| pH @ 25° C. | 9.4 |
| Viscosity @ 25° C., centistokes | 550–885 |
| Solids content, percent | 50 |

A sizing material may be added to the resin-fiber slurry if desired. Any of the proprietary wax sizing materials is suitable and is usually employed about 1–2% of the fiber weight based on the bone-dry fiber.

The acidic precipitating agents used are preferably composed of sulfuric acid and papermakers' alum; however, sulfuric acid alone may also be used. Satisfactory results have been achieved with sodium aluminate-hydrochloric acid mixtures as well.

The resin-bearing fibers are formed into a fiber mass on a fiber-retaining screen. It is desirable to retain enough fiber on the screen to provide from about 0.03 to 0.75 pound of bone-dry fiber per square foot. Most substrate materials can be adequately covered with 0.20 to 0.30 pound of dry fiber per square foot; however, usually rough surfaces may require more fiber. Relatively smooth substrates, such as those made of fine, even textured woods need only about 0.03 to 0.20 pound of fiber per square foot to provide excellent covering qualities.

It has been discovered that resin-containing fiber masses formed as described above can be converted to self-supporting fiber mats by cold pressing to a thickness between about 0.1 and 0.5 inch and a specific gravity of from about 0.15 to 0.30 and by removing moisture until the mat moisture content is between about 12% and 200% based on the dry fiber weight.

A minimum of about 12% moisture in the mat is required to plasticize the fibers enough to permit pressing at the relatively low panel pressures required for plywood and particle board manufacture. Above about 200% moisture content the mats are not sufficiently stiff to be self-supporting.

The drying must be done without appreciably curing the resin in the mat. This can be accomplished by low temperature drying as in the open air, or in a low temperature oven. Normally, oven drying will be the most economical and therefore preferred. Commercial insulation board roller type driers have been used successfully.

If the mats are to be stored for more than a few hours before use, it is desirable to protect them from changes in moisture content outside the 12% to 200% range desired. Wrapping a stack of mats in polyethylene sheeting will adaquately protect against moisture changes for many days.

The following examples describe the preparation of fiber mats suitable for surfacing woody boards.

*Example I*

A surfacing material for plywood is prepared as follows:

Raw Douglas fir wood chips having a mesh size of about 1 inch are mixed with water in the proportions of about 10 parts of wood chips, by weight, to 100 parts of water, by weight. This mixture is heated to about 200° F. and then passed through a fiber attrition mill to form a fiber slurry. The fiber slurry is next diluted by the addition of water to provide a fiber consistency of about 2%.

The alkaline, phenol-formaldehyde, water dispersible resin described above is next added to the fiber slurry in an amount to provide about 10% of resin solids based on the dry weight of the fiber present. A commercial wax size in the form of a 50% solids wax emulsion is also added in an amount to provide 1% of wax solids based on the dry weight of fiber. The slurry is then stirred for 15 minutes to assure a uniform distribution of the resin and wax.

An acidic resin precipitating agent consiting of 10 parts of concentrated sulfuric acid and 10 parts of aluminum sulfate dissolved in 80 parts of water is next added to the slurry. Sufficient acid precipitating agent is added to provide a pH of 4.5 in the slurry as measured with a glass electrode. The acidified slurry is then stirred for 30 minutes.

Wet fiber mats are formed by separating the fibers from the liquid on an 80 mesh screen. Sufficient slurry is poured through the screen to provide 0.25 pound of dry fiber per square foot of screen. The wet fiber mat, stripped from the screen, is next placed in an unheated press and consolidated under 100 p.s.i. pressure. A screen, placed between the lower press platen and the mat, facilitates drainage of water from the mat during pressing. When water drainage stops the pressed mat is removed from the press. In general drainage is complete in about 1 minute. The mat will then be about ¼ inch thick.

The mat is next dried in room temperature air until its moisture content, based on the dry fiber weight, is reduced to 16%.

The finished mat will be dry to the touch, and sufficiently strong and stiff to be readily handled and transported, or stored in stacks.

*Example II*

A surfacing material for plywood was prepared according to Example I; however, the wax size was added in an amount to provide 2% of wax solids based on the dry weight of the fiber and the slurry was stirred for 30 minutes before precipitating the resin. The mat was dried to 50% moisture content in a forced air dryer having a temperature of 130–140° F.

*Example III*

A fiber slurry was prepared according to Example I containing 2% wax size and 5% phenol formaldehyde resin solids. The mat was then formed, pressed, and dried in a forced air dryer at 130°–140° F. to a moisture content of 22%.

Plywood is produced commercially in both exterior and interior grades. Exterior and interior plywood is generally made with a hot press adhesive based on an alkaline phenol-formaldehyde resin mixed with suitable extenders, water, and alkalis. Interior plywood is also frequently made by hot pressing using adhesives based on animal blood.

The mats of this invention may be bonded to either type of plywood with either type of adhesive.

The phenol-formaldehyde resin suitable for compounding an adhesive to bond veneers to form plywood is prepared in a resin kettle by mixing:

| | Parts by weight |
|---|---|
| Phenol | 100 |
| Water | 93.6 |
| Formaldehyde (37% inhibited grade) | 177.5 |
| Sodium hydroxide (50% solution) | 37.9 |

Heat the mixture to 100° C. in 100 minutes while continuously agitating. Measure all viscosities at 25° C., and react at 100° C. until the viscosity reaches 50 centistokes. Then cool to 72° C. in 140 minutes and react at 72° C. until the viscosity reaches 3400 centistokes. Then add:

| | |
|---|---|
| Sodium hydroxide (50% solution) | 8.9 |

Hold at 75° C. until the viscosity reaches 800 centistokes, and add:

| | |
|---|---|
| Sodium hydroxide (50% solution) | 19.3 |

Hold at 80° C. until the viscosity reaches 470 centistokes, then cool rapidly to below 25° C. for storage. The resin will have approximately the following constants:

| | |
|---|---|
| Molar ratio of formaldehye to phenol | 2.04 |
| Percent NaOH | 7.5 |
| Solids content, percent | 42 |
| Viscosity @ 25° C., centistokes | 470–500 |

A suitable resin-based adhesive for exterior plywood is prepared from this resin by mixing in a conventional glue mixing machine:

| | Parts by weight |
|---|---|
| Water @ 70° F. | 205 |
| Furafil [1] adhesive extender | 100 |
| Wheat flour | 20 |
| Stir mixture until lump free | |
| Phenol formaldehyde resin | 50 |
| Mix 3 minutes | |
| Sodium hydroxide (NaOH) | 22½ |
| In water | 22½ |
| Mix 15 minutes | |
| Sodium carbonate ($Na_2CO_3$) | 15 |
| Mix 5 minutes | |
| Phenol-formaldehyde resin | 565 |
| Mix 1 minute | |

[1] The finely ground residue from the manufacture of furfural by acid hydrolysis of agricultural waste products.

A fiber-faced exterior grade plywood panel is prepared according to the following:

*Example IV*

A veneer assembly is prepared by passing two pieces of 3/16 inch Douglas fir veneer core stock, each having a moisture content of about 2%, between the applicator rolls of a plywood glue spreading machine containing the above adhesive. The glue is applied to the cores at a spread rate of about 60 pounds of wet glue per thousand square feet of double glue line. The adhesive coated cores are next assembled on each side of a 3/16 inch, uncoated center veneer whose grain is disposed at right angles to the adjacent cores. A fibrous mat prepared according to Example I is placed next to the adhesive coated face of each core veneer and the assembly allowed to stand 10 minutes. The assembly is then placed in a heated plywood press. Pressure and heat are applied to consolidate the assembly and simultaneously cure the fiber mat and the resin-containing glue lines. The press platens are heated to 285° F. and pressure of 185 p.s.i. is applied to the panel surface. Stops are used between the platens of the press to provide a final panel thickness of 3/4 inch. Pressure is maintained for 7½ minutes and the panel is then removed from the press and allowed to cool to room temperature. The surface of the finished panel is dense, hard, and smooth without defects of any consequence.

An interior plywood adhesive may be prepared by mixing:

| | Parts by weight |
|---|---|
| Water @ 70° F. | 200 |
| Pine oil | 4.5 |
| Spray dried soluble blood | 100 |
| Wood flour | 26 |
| Mix until smooth | |
| Water @ 212° F. | 500 |
| Mix 4 minutes | |
| Water (cold) | 100 |
| Mix and cool to 90° F. | |
| Sodium hydroxide | 12 |
| Dissolved in | |
| Water | 12 |
| Mix 4 minutes | |
| Alkaline phenol-formaldehyde resin | 50 |
| Mix 2 minutes | |
| Ca(OH)$_2$ | 9 |
| Suspended in | |
| Water | 18 |
| Mix 2 minutes | |
| Sodium silicate solution | 45 |
| Mix 3 minutes | |

Using this adhesive, fiber-faced interior grade panels were prepared as follows:

*Example V*

The interior adhesive described above was placed on a glue spreading machine and the spread adjusted to provide 77.5 pounds of wet adhesive per thousand square feet of double glue line. A veneer assembly was prepared by passing two pieces of 0.1 inch thick Dougle fir veneer through the spreader and assembling these coated pieces in cross-grained relationship to an uncoated center veneer of the same thickness. Mats made according to Example II above were positioned next to the outer faces and the assembly was allowed a 5 minute assembly time and then placed in a conventional plywood press. A screen was placed on each side of the veneer assembly between the mat and the platen surface to permit the escape of moisture. The assembly was pressed at 275° F. platen temperature and at 300 p.s.i. pressure for 1½ minutes following which the pressure was reduced to 175 p.s.i. for 4½ minutes. Stops were used to limit the closing of the press to 3/8 inch.

All parts of the panel were well bonded and substantial fiber failure was noticed when the fiber-veneer glue line was opened with a knife. The fiber surface was dense, hard, and without defects of any consequence. The fiber surface showed marks from the screen; however, these marks were readily removed by light sanding.

Mats produced according to this process are useful to improve the surface of particle boards. Such boards are produced by compressing resin coated wood chips while simultaneously curing the resin to an infusible state. Urea-formaldehyde resins are normally used for particle board manufacture and most such commercial resins are satisfactory for producing particle boards with the improved fiber surfaces of this invention. The following examples are illustrative of the manufacture of such boards.

*Example VI*

A particle board with a void free fiber surface was produced as follows:

Douglas fir wood particles having an over-all size range of +8 to −100 mesh were adjusted to a moisture content of 9.8%.

The particles were placed in a tumbling mixer and spray coated with a mixture of a commercial urea-formaldehyde resin for particle board and a wax emulsion size. Sufficient resin-wax mixture was applied to provide 6% resin solids, and 1% wax solids, based on the dry wood. The particles had a final moisture content of 11.9% after coating, most of the additional water being derived from the resin solution.

Next, 915 grams of the above particles were felted to form a mat 12" x 12" and about 3" thick. The mat was then cold pressed at 50 p.s.i. for ½ minute to form a consolidated, uncured substrate mat about 1½ inches thick.

A fiber mat according to Example I, having about 15% total moisture content, was placed on top of the particle substrate and the assembly placed in a press heated to 285° F. with stops placed between the platens to insure a press opening of 3/4 inch.

Pressure in the amount of 125 p.s.i. was applied to the platens to compress the assembly to 3/4 inch thickness in 4¼ minutes. Ten minutes after initially applying pressure the press was opened and the board removed and allowed to cool to room temperature. The finished panel surface was dense, hard, defect free, and smooth.

Attempts to separate the face material from the substrate with a knife showed the bond to be excellent. In all attempts the broken surface showed complete fiber coverage.

*Example VII*

A second particle board mat, prepared as in Example VI, had a fiber surfacing mat containing 30% moisture content applied to each face. Pressure of 130 p.s.i. was applied to the assembly with the press platens heated to 285° F. The press closed to the stops in 3½ minutes and was mainained closed for a total of 10 minutes pressing time.

The bond was examined as described in Example VI and an excellent bond noted.

It has been discovered that asbestos fibers may be incorporated in the mat to improve the fire resistance of the surfaced boards. Referring to Example I, 25% by weight of the wood fibers in the slurry can be replaced with an equal weight of asbestos fibers and the board can then be formed. The asbestos containing mats can be bonded to plywood panels by hot pressing with conventional adhesives as described in Examples IV and V.

The surfaced boards produced by the process of this invention can also be treated in various other ways to improve their properties. The surfaces may be sanded or planed or otherwise treated to enhance their appearance or utility. For example, the curved boards may be treated with fire retardant agents by spraying or soaking or may be impregnated with asphalt or various resins to provide a waterproof surface.

What is claimed is:

1. A process of making an overlaid woody product, comprising; screen forming a porous compressible mat consisting essentially of whole wood fibers from an aqueous, fiber slurry to a thickness of from 0.1 to 0.5 inch thick and a specific gravity of from 0.15 to 0.30; said fibers having an uncured synthetic resin solids precipitated uniformly thereon in an amount of at least about 5% based on the dry fiber weight; adjusting the moisture content of said porous mat to between about 12% and 200% based on the dry fiber weight; disposing said mat in face to face relation to an unconsolidated substrate of adhesive bearing woody members; consolidating said substrate and mat heat and pressure to cure the resin and adhesive content and provide said cured mat with a specific gravity of between about 0.7 and 0.95, thereby filling any voids in the surface of said substrate.

2. A fiber-surfaced wood product, comprising: a woody substrate, the outer surface of said substrate having voids and surface irregularities therein; and an overlayment consisting essentially of whole wood fibers bonded to said outer surface, and to each other, said overlayment containing at least about 5% of thermoset, synthetic resin solids substantially uniformly distributed therein, said overlayment having a thickness between about 0.020 and 0.125 inch and a specific gravity between about 0.70 and 0.95 based only on the dry solids weight, the voids in the outer surface of the substrate being at least partially filled with said overlayment, the outer surface thereof being smooth and substantially void free.

3. A fiber-surfaced wood product in accordance with claim 2 wherein said substrate is veneer.

4. A fiber-surfaced wood product in accordance with claim 2 wherein said substrate is discrete wood particles adhesively united.

5. A fiber-surfaced wood product in accordance with claim 2 wherein said substrate is whole wood.

6. A process of making a woody, fibrous mat, comprising: mechanically defibrating wood chips in the presence of water only to form a slurry consisting essentially of whole wood fibers; adjusting the slurry to a consistency from about 0.5% to about 2.5%; adding to said slurry between about 5% and about 20% of water dispersible, acid precipitable, alkaline, phenol-formaldehyde resin solids, based on the dry weight of the fibers; stirring the mixture until it is homogeneous; precipitating the resin solids on the fibers by reducing the pH of the mixture to below about 8; forming a dewatered fibrous mat having a bone-dry weight of from about 0.03 to about 0.75 pound per square foot by separating the fibers from the free water on a fiber retaining screen; partially consolidating the mat to a thickness between about 0.1 and 0.5 inch and a specific gravity of from about 0.15 to 0.30 while removing additional water therefrom; and providing a final moisture content in the mat between about 12% and about 200% based on the dry weight of the fibers by drying without curing the resin to an infusible state.

7. A consolidated porous mat consisting essentially of whole wood fibers; uncured, thermosettable, acid-precipitated, phenol-aldehyde resin solids; and moisture; said mat having sufficient internal strength to be supportable by its edges only, and possessing the capability of being stored without substantial loss of its curing and compressibility properties essential to its subsequent use as a surfacing material for application to a woody substrate, said mat ranging in thickness from about 0.1 inch to about 0.5 inch thick and having a specific gravity of from 0.15 to 0.30, said resin solids being uniformly distributed throughout the mat in an amount of at least about 5% of the dry fiber weight, the moisture content of said mat ranging from about 12% to about 200% based on the dry fiber weight.

References Cited by the Examiner
UNITED STATES PATENTS
2,656,296 10/1953 Grangaard ------- 162—165 X
2,804,418 8/1957 King ------------ 162—165 X
3,028,285 3/1962 Rogers ---------- 161—262 X

OTHER REFERENCES
Casey: "Pulp and Paper," 2nd edition, vol. 1, Interscience Publishers, Inc., N.Y. 1960, pp. 324–334.

DONALL H. SYLVESTER, *Primary Examiner.*

S. LEON BASHORE, *Examiner.*